(12) United States Patent
Krishnamurthy et al.

(10) Patent No.: US 8,949,327 B2
(45) Date of Patent: Feb. 3, 2015

(54) METHOD AND DEVICE TO PROVIDE TRUSTED RECOMMENDATIONS OF WEBSITES

(75) Inventors: Balachander Krishnamurthy, New York, NY (US); Ramon Caceres, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 384 days.

(21) Appl. No.: 12/274,926

(22) Filed: Nov. 20, 2008

(65) Prior Publication Data

US 2010/0125630 A1    May 20, 2010

(51) Int. Cl.
  *G06F 15/16* (2006.01)
  *G06F 17/30* (2006.01)
  *G06Q 10/10* (2012.01)
  *G06Q 50/10* (2012.01)

(52) U.S. Cl.
  CPC .......... *G06F 17/30867* (2013.01); *G06Q 10/10* (2013.01); *G06Q 50/10* (2013.01)
  USPC ............................ 709/204; 709/205; 707/708

(58) Field of Classification Search
  CPC ...................................................... H04L 51/32
  USPC ................................... 709/203, 204; 707/708
  See application file for complete search history.

(56) References Cited

U.S. PATENT DOCUMENTS

| | | | | |
|---|---|---|---|---|
| 2005/0246420 | A1* | 11/2005 | Little, II | 709/204 |
| 2007/0067297 | A1* | 3/2007 | Kublickis | 707/9 |
| 2008/0005761 | A1* | 1/2008 | Repasi et al. | 725/13 |
| 2008/0147659 | A1* | 6/2008 | Chen et al. | 707/7 |
| 2008/0275719 | A1* | 11/2008 | Davis et al. | 705/1 |
| 2009/0299819 | A1* | 12/2009 | Davis et al. | 705/10 |

OTHER PUBLICATIONS

"Digg—All News, Videos, & Images", downloaded from http://digg.com on Nov. 11, 2008.
"Technorati: Front Page", downloaded from http://technorati.com on Nov. 11, 2008.
"ZAGAT: Ratings & Reviews for New York, Los Angeles, San Francisco, Philadelphia and Restaurants Everywhere", downloaded from http://www.zagnat.com on Nov. 11, 2008.
"LinkedIn: Answers: Home" downloaded from http://linkedin.com/answers on Nov. 11, 2008.
U.S. Appl. No. 12/290,449, filed Oct. 30, 2008, Inventor: Graham Cormode, et al.

* cited by examiner

*Primary Examiner* — Glenford Madamba
(74) *Attorney, Agent, or Firm* — Wolff & Samson, PC

(57) ABSTRACT

In embodiments of the disclosed technology, a plurality of ratings of, for example, websites is received, wherein each rating is associated with a category and a rater, and each rater is associated with at least one group. A selection of a category is received from the user, wherein the user is associated with at least one group. One website location, or a plurality of website locations, is provided in the category to the user, based on at least one rating of the plurality of ratings provided by at least one of the raters, wherein at least one group associated with the rater and at least one group associated with the user are the same group.

9 Claims, 4 Drawing Sheets

METHOD AND DEVICE TO PROVIDE TRUSTED RECOMMENDATIONS OF WEBSITES

FIELD

The disclosed technology relates generally to recommendations to others and more particularly to the recommendations of websites by trusted colleagues and friends.

BACKGROUND

Numerous recommendation systems have been built over the years and tagging has become a popular phenomenon on the Web. In Web 2.0 systems like Flickr and even in older Web 1.0 sites, a large number of tagging systems such as digg, del.ici.ous, etc. have been created to let users indicate their approval of a Web page. As a result of a large number of users tagging a site, its value is potentially enhanced. Highly rated sites get featured in the front page of digg, which allows other users to follow popular pages. Search engines have been using popularity-based rankings (e.g., PageRank) for years to rank order the search results.

When a very large number of users approve of a site, it will likely be of interest to many other users. However sites that are rated favorably by a smaller number of users may also be of interest. It is often unclear and difficult to discern the importance or value of a site which has few ratings, though even these few ratings may be more valuable than ratings of a site which has garnered many more ratings. Other such examples occur in the offline world. For example, a recommendation by a dozen friends of a restaurant may be more helpful to a person than a global popularity rating obtained through a ranking system such as Zagat. When a user examines a particular piece of content such as a Web page, a search result, or a particular cultural event, the user often relies on external editors to evaluate the content. However, a user's friends are more familiar with the user's tastes and for that reason their recommendations are much more valuable to a user than recommendations from even large numbers of people who don't know the user.

Currently, available online systems, such as those described above, allow anyone to tag a site. The followers of the tags do not have any information beyond quantity. There has been a long-felt and unsolved need to improve upon ratings to the user viewing the ratings.

SUMMARY

Embodiments of the disclosed technology provide methods and devices to evaluate raters of websites. Users can select trusted raters, and a circle of friends rating websites may feel less inhibited or may even feel encouraged to rate sites for their peers. The narrower set of trusted raters enhances the value of the recommendation.

An embodiment of the disclosed technology may be a device, a method, or a computer-readable storage medium with instructions for carrying out the following: A plurality of ratings of websites is received, wherein each rating is associated with a category and a rater, and each rater is associated with at least one group. A selection of a category is received from the user, wherein the user is associated with at least one group. A website location is provided in the category to the user based on at least one rating of the plurality of ratings provided by at least one of the raters, wherein at least one group associated with the rater and at least one group associated with the user are the same group. In this manner, website suggestions or ratings can be provided to a user based on ratings made within a group that the user trusts.

In further embodiments of the disclosed technology, the rater and the user may be interchangeable entities. Data may be received from the user comprising data associating a rater with a group. At least one group may have within it raters who are trusted by at least some of the other raters in the group, and further, the raters may be trusted by the user. Based at least in part on a level of trust, website locations may be provided to the user.

DETAILED DESCRIPTION

Embodiments of the disclosed technology provide a device, method, and a computer readable storage medium with instructions for implementing the disclosed technology. A plurality of ratings of websites is received, wherein each rating is associated with a category, such as a genre or topic. The category may be selected by a rater or determined based on a scan of the content of the page, content of pages linking to that page, the interests of the rater, and/or by looking up category information stored in a pre-existing database. Each rater is associated with at least one group and each user is associated with at least one group. A group may be one which is trusted by a user seeking a rating, such as those designated as such by the user, designated as such by friends of the user, connected to the user in an online social network (either by a first degree or greater degree of connection), and/or trusted or rated as trustworthy by other members of the group. It should be understood that while this disclosure is written in terms of ratings of websites, the disclosed technology may include ratings of any items such as restaurants, movies, books, etc.

A selection of a category is received from the user, wherein the user is associated with at least one group. A website location is provided to the user in the selected category based on at least one rating of the plurality of ratings provided by at least one of the raters. The rating is provided by a rater within the group (as defined at least in the previous paragraph). The rater and the user may be in the same group, which may be accomplished by the user trusting a rating of a rater made by another member of the group. In this manner, website suggestions or ratings can be provided to a user based on ratings made within a group that the user trusts.

Figure 1:
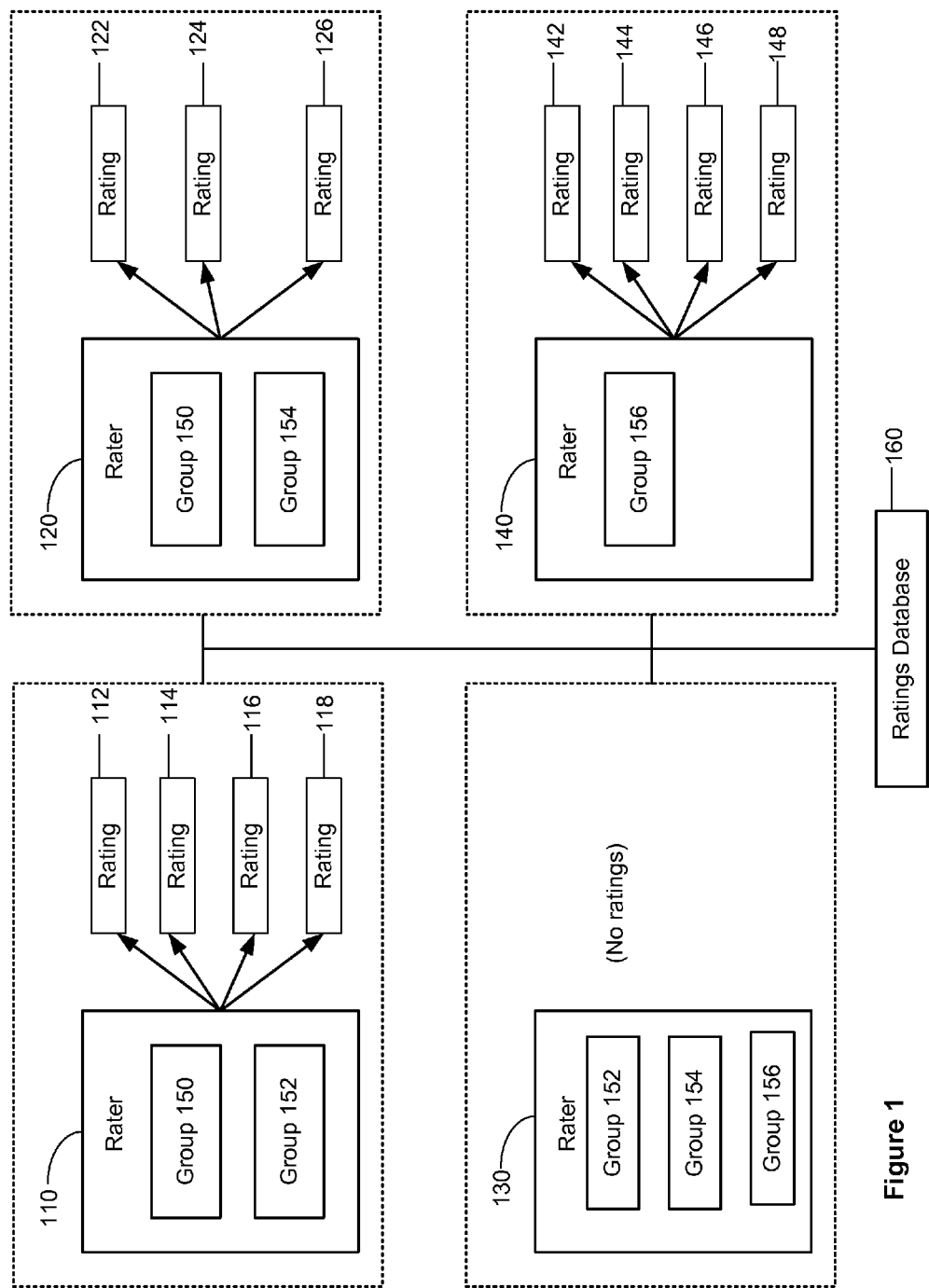
FIG. 1 shows a structural relationship between raters, groups, and ratings which may be used to carry out embodiments of the disclosed technology.

FIG. 1 shows a structural relationship between raters, groups, and ratings which may be used to carry out embodiments of the disclosed technology. Four raters 110, 120, 130, and 140 are each associated with respective groups. It should, of course, be understood that any rater may be also be a user for purposes of the description of embodiments of the disclosed technology. A rater, in the context of this disclosed technology, is one who provides at least one rating of a website; and a user, in the context of this disclosed technology, is one who seeks a recommendation of a website. Thus, interchangeably, at times a person may be a rater, and at other times, the person may be a user.

Each rater is associated with at least one group and may provide ratings of websites. A rating of a website, for purposes of this disclosure, is an opinion of the taste of a rater (a user submitting the rating) which comprises at least a URL (uniform resource relocator), an IP (internet protocol) address, or any other data which would refer a person or machine to a particular location on the network or the data which was being rated on what is collectively known as the Internet. In the example of FIG. 1, rater 110 is associated with groups 150 and 152. Rater 120 is associated with groups 150 and 154. Rater 130 is associated with groups 152, 154 and 156. Rater 140 is associated with group 156. In this manner, each rater may be associated with one or more groups.

Groups are most commonly known in online social networks. For example, one can create a group for a specific cause (i.e., fighting cancer), a school (i.e., Rutgers alumni), or a group of one's friends (i.e., Johnny's friends). Groups may also be "all the people that a user is connected to on a $1^{st}$ degree level (connected directly to this person), $2^{nd}$ degree (connected to a $1^{st}$ degree connection), $3^{rd}$ degree (connected to a $2^{nd}$ degree connection), and so forth, up to, typically, $5^{th}$ or $6^{th}$ degree connections. "Connected to," in the world of online social networks, typically means the connection is in some way listed in the connected-to person's profile or greater access to private data is allowed for connected-to people.

Referring again to FIG. 1, a rater, such as rater 110, 120, 130, or 140, will trust or receive a rating of a website only from another user who is part of the same group. For example, since rater 110 is part of group 150 and group 152, this rater may receive ratings from rater 120 and/or rater 130 (if rater 130 provided any ratings). In this small example, except for a category which will be discussed in reference to FIG. 2, rater 110 may receive rating 122, rating 124, and/or rating 126. In another example, let us suppose that rater 130 is the user seeking a rating. As the groups to which rater 130 belongs include groups 152, 154 and 156, which intersect with the groups of rater 110 and rater 120, any of the ratings 112, 114, 116, 118, 122, 124, and/or 126 may be provided to rater 130. Rating 112 and 122 may, for example, be a rating of the same website. In this example, suppose rating 112 is a very negative rating and rating 122 is a very positive rating. Any standard mathematical computations may be used to decide how to weight each rating. A very positive or very negative rating in comparison to others may be ignored (in real world examples, there may be hundreds of ratings of a website), ratings may be averaged, and/or ratings may be weighted, such as based on a level of trust, i.e., how close in connection (such as $1^{st}$ degree or $2^{nd}$ degree) are the raters, and/or how much has the user indicated he or she trusts a particular rater. Finally, ratings may be evaluated simply on quantity. That is, if one website has 100 ratings by raters who are group members and another has 50 ratings by raters who are group members, the 100 ratings will be more prominent.

Still further, it should be noted that when rater 120, by way of example, seeks a rating of a website, ratings 142, 144, 146, and 148 will be excluded because rater 140 is not in a group in which rater 120 is a member. Thus, ratings received by rater 120 will only include ratings by group members which may be trusted people and will be more valuable to the user seeking the ratings.

In embodiments of the disclosed technology, the ratings which are associated with a specific rater are stored in a ratings database 160. Such a ratings database may be a stand-alone database used by a server carrying out embodiments of the disclosed technology and/or may be part of a user's profile in an online social network, or the like.

Figure 2:
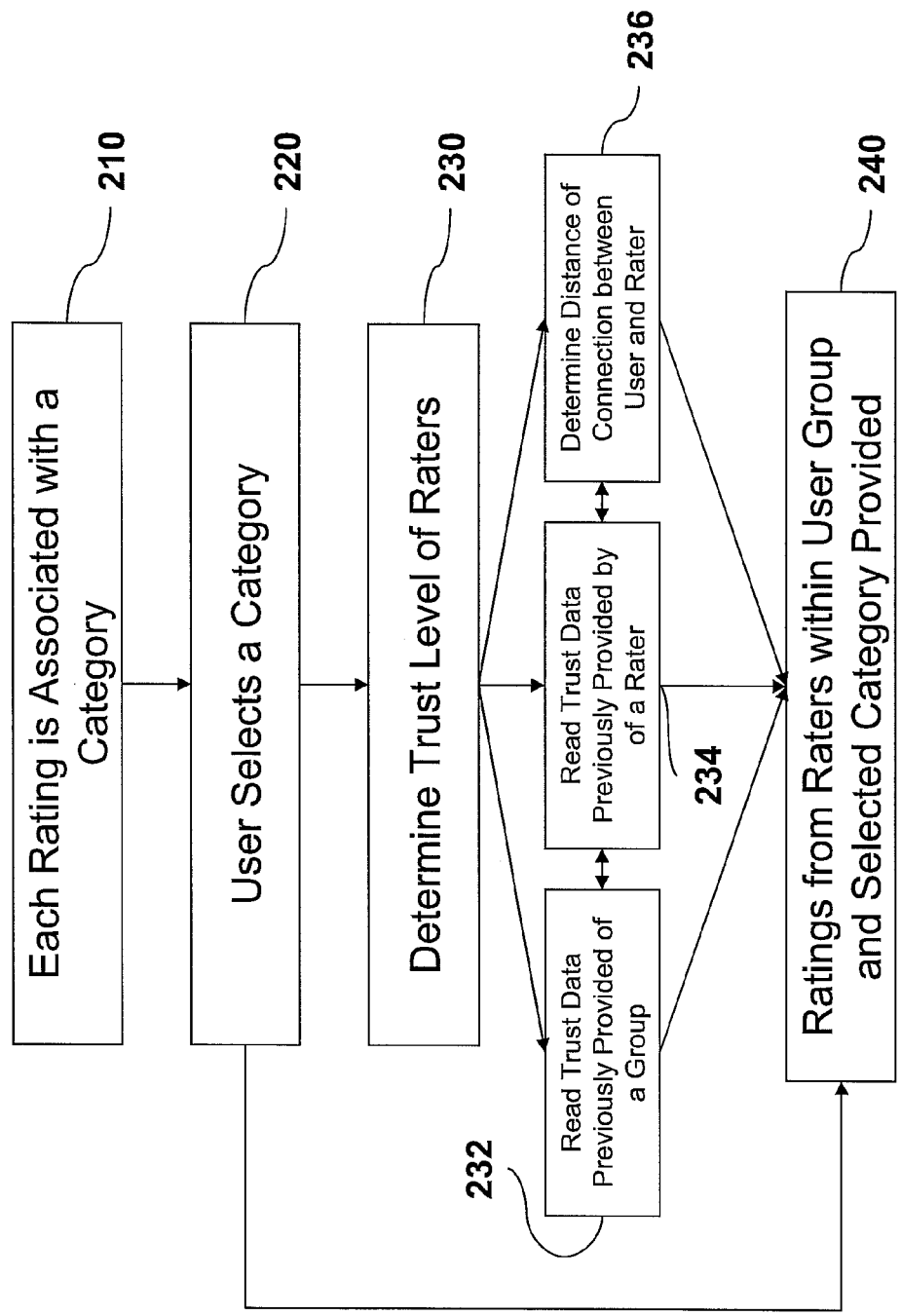
FIG. 2 shows a method of providing a rating or ratings to a user in embodiments of the disclosed technology.

FIG. 2 shows a method of providing a rating or ratings to a user in embodiments of the disclosed technology. In step 210, each rating is associated with a category. As described above and will be described in more detail at this time, the category association may be one of a few types of associations. The category may be a genre such as, "Patent Law Firm Websites," "Encyclopedia Pages," "Technology Websites," "Clipart," and/or "Ducks." A category designation may be determined based on the user's pre-defined interests, such as are selected by the user or determined based on the websites that a user visits or the user recommends. Then, in step 220, the user selects a category (or a category is determined based on any of the same criteria in which a category was selected in step 210) from which to receive a website recommendation. In this manner, in step 240, ratings from ratings within the selected category and from within a group of raters trusted by the user are used to provide a website to the user.

An optional step, step 230, may be carried out to determine a trust level of raters. In embodiments of the disclosed technology, such as where the number of ratings of a website is counted, the trust level will be binary (either the user trusts the rater or does not trust the rater), and only ratings from a trusted rater will be counted. In other embodiments, trust level may be inverse to the number of degrees away from the user. For example, a rating by a $1^{st}$ degree connected rater may receive a relative value of "1," a second degree rater, a relative value of "½," and a third degree rater, a relative value of "⅓," and so fourth. Or, a user may indicate how far out to trust raters, i.e., all raters who are $3^{rd}$ degree connections and closer. The user may also indicate a weighting for each user.

These rating methods are at least partially embodied in optional steps 232, 234, and 236, any one of which, or a plurality of which, may be carried out in embodiments of the disclosed technology. In step 232, previously provided trust data of a group may be provided. Perhaps group 150 is trusted more than group 152. For example, group 150 may be all $1^{st}$ degree connections of rater 110 on a particular social network, and such ratings are valued highly. Group 152 might be all people associated with a group called "animal lovers." This group may be trusted highly for ratings in the category of dog websites, but not trusted for laptop reviews. Thus, the user may select ratings only from group 152 or value such ratings higher.

Similarly, the rating of the group may be provided by other group members. The $1^{st}$ degree connections of the user, such as rater 110, may, for example, rate those in group 152 (the "animal lovers" group) highly. However, or conversely, such raters in group 152 may be given a low rating by the $1^{st}$ degree connections of the rater 130. Thus, when user 110 seeks a recommendation or rating of a website, the result may be very different from when user 130 seeks a recommendation even from within the same group, because the trusted parties of each respective user (in this case, $1^{st}$ degree connections) value the group's recommendations differently. This is, of course, more valuable than just a blanket rating or recommendation of a site by all, because those trusted by the user seeking a rating, or those trusted who are within a group of which the user is a member, will rate websites more in accordance with the tastes of the user, and the user and the raters are more closely allied in tastes or knowledge of each other.

Step 234, reading trust data previously provided by a rater, is similar to that of step 232, except that the trust data are a rating of trust (which may again be binary or scaled) of an individual rater. The trust of such a rating may only be taken into account when the user is connected (i.e., 1$^{st}$ or 2$^{nd}$ degree) to the rater providing the rating of trust. For example, a person may trust his friend's assessment as to whether a 3$^{rd}$ party has good taste or may be trusted to give good ratings, but might not trust a stranger's evaluation of same. The trust data in step 234 may be all trust data provided by members of a group of which the user seeking a rating is also a member.

In step 236, it is determined, based on distance of connection between a user and a rater whether or not the rater can be trusted, and if so, in some embodiments of the disclosed technology, how much trust to assign. As described above, those who are more closely connected or within a certain radius of connection may be trusted to provide ratings or trusted to a greater degree.

Figures 3A, 3B:
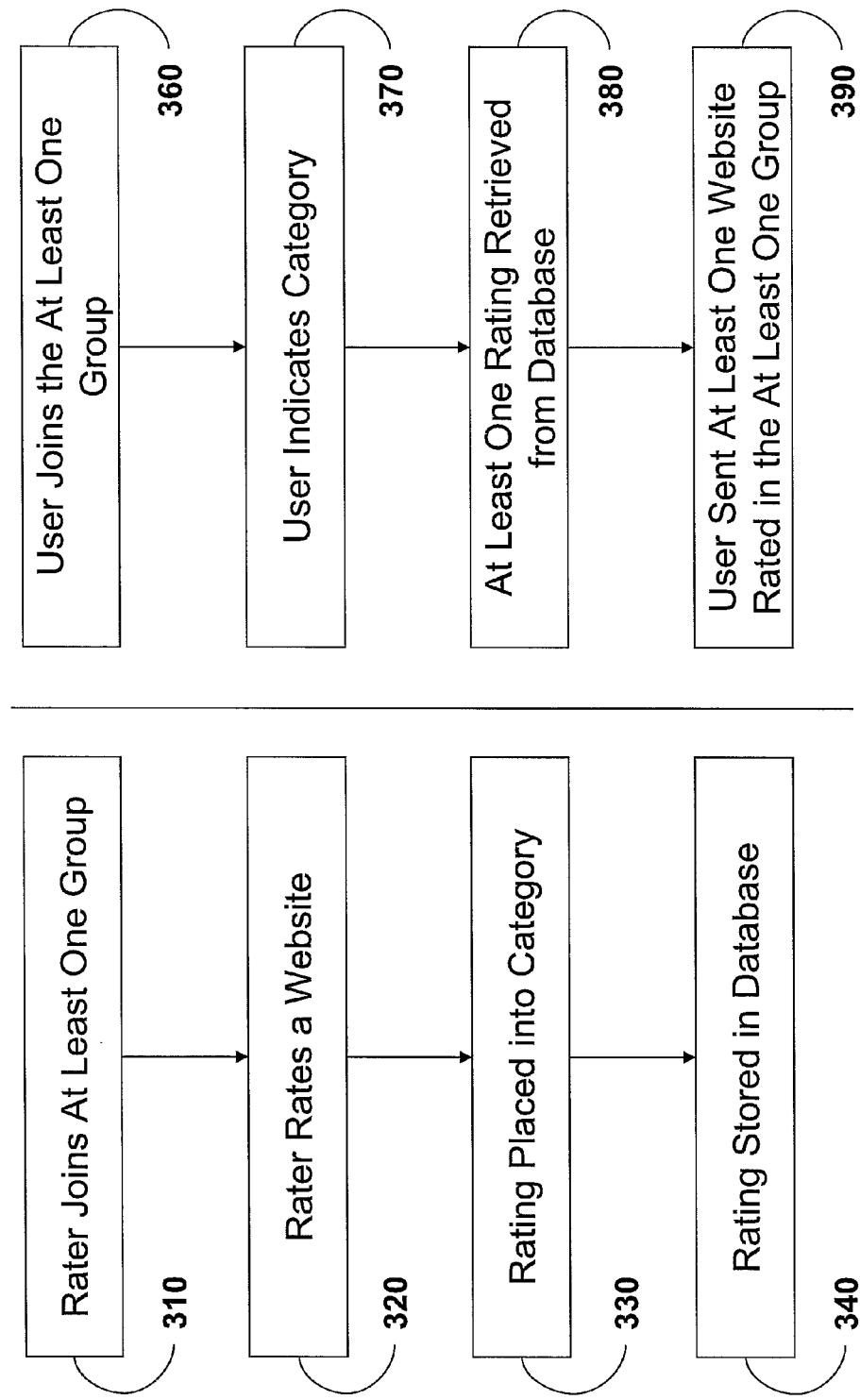
FIG. 3A shows steps which may be taken by a rater to store a rating in an embodiment of the disclosed technology.
FIG. 3B shows steps which may be taken by a user seeking a recommendation for a website.

FIG. 3A shows steps which may be taken by a rater to store a rating in an embodiment of the disclosed technology. FIG. 3B shows steps which may be taken by a user seeking a recommendation for a website. The rater or user may be any one of raters 110, 120, 130, or 140. The steps shown in the figure may each take place just once, or more than once, and may be carried out by a plurality of raters in an embodiment of the disclosed technology and/or by a single rater and/or user multiple times. The steps may also take place in quick succession or may be carried out over a longer period of time. In step 310, a rater joins at least one group (groups have been described above at least with reference to FIG. 1). A database or computer device may receive an indication of the rater joining such a group as is known in the art, such as when a web server receives data indicating that a user has joined a particular group in an online social network. In a similar manner, a rater may rate a website in step 320, whereby such data are sent by the user and received by a server, and a website is rated. In step 330, the rating is placed into a category either by automated means, as described above, or by the rater sending data which are received by a server indicating a category of website. In step 340, the rating is stored in a database.

Referring now specifically to FIG. 3B, in step 360 a user, in this case a user seeking a recommendation or a rating of one or more websites in a specific category, joins at least one group (or is already part of such a group). Again, the group may be a group of trusted individuals, as described with reference to at least FIG. 2. In step 370, the user selects a category and, in step 380, at least one rating is retrieved from the database. It should be understood that embodiments of the disclosed technology may be carried out with many raters and users, such that a user seeking a recommendation or rating stored in the database may receive many ratings of many websites and/or many ratings of a single website. A database, such as database 160, may comprise many entries of many websites, each having many ratings. In step 380, the user is sent at least one website which has been rated by at least one person who is a member of a group to which the user belongs. Additionally, the rater or user may limit ratings or receipt thereof to ratings within a specified group, such as if the rater or user is a member of more than one group. The ratings or recommendations received may be of one or a plurality of websites and may be sent from a server to the user.

Figure 4:
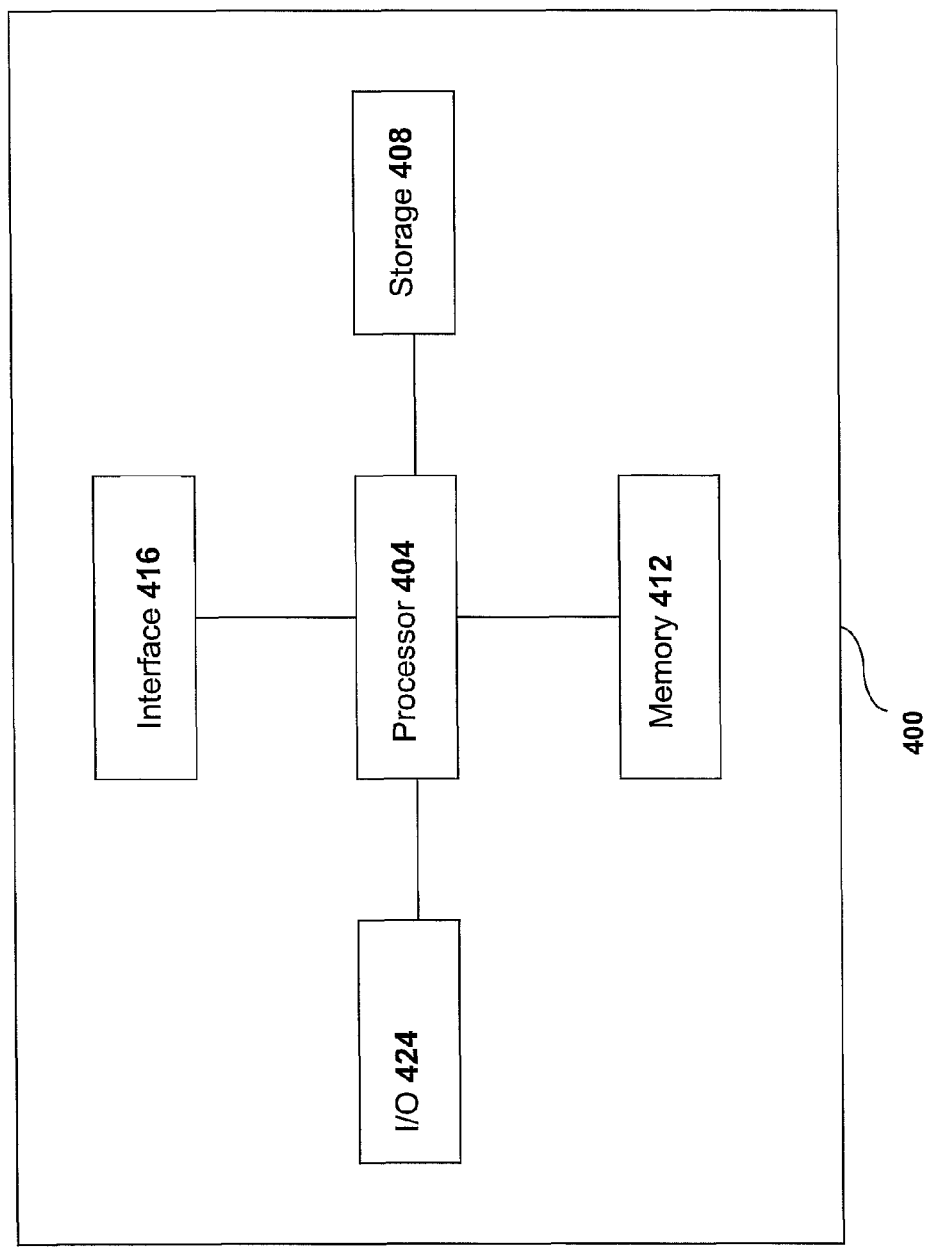
FIG. 4 shows a high level block diagram of a computing device on which embodiments of the disclosed technology may be carried out.

FIG. 4 shows a high level block diagram of a computing device on which embodiments of the disclosed technology may be carried out. Computer 400 contains a processor 404 that controls the overall operation of the computer by executing computer program instructions which define such operation. The computer program instructions may be stored in a storage device 408 (e.g., magnetic disk, database) and loaded into memory 412 when execution of the computer program instructions is desired. Thus, the computer operation will be defined by computer program instructions stored in memory 412 and/or storage 408, and the computer will be controlled by processor 604 executing the computer program instructions. Computer 400 also includes one or a plurality of input network interfaces for communicating with other devices via a network (e.g., the Internet). Computer 400 also includes one or more output network interfaces 416 for communicating with other devices. Computer 400 also includes input/output 624, representing devices which allow for user interaction with the computer 400 (e.g., display, keyboard, mouse, speakers, buttons, etc.). One skilled in the art will recognize that an implementation of an actual computer will contain other components as well, and that FIG. 4 is a high level representation of some of the components of such a computer for illustrative purposes. It should also be understood by one skilled in the art that the method and devices depicted in FIGS. 1 through 3 may be implemented on a device such as is shown in FIG. 4

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method of providing ratings to a user comprising:
receiving a selection of a category from a first user;
retrieving ratings associated with the category received from a first rater, wherein the ratings associated with the category retrieved correspond to a first group to which the first user and the first rater both belong but a second user does not belong, wherein retrieving ratings further comprises:
based on the first user and the first rater belonging to the first group, retrieving a second rating from the first rater that corresponds to a second group to which the first rater and the second user both belong but the first user does not belong; and
providing a particular retrieved rating to the first user, the particular retrieved rating based on: a weighting of the particular retrieved rating, a trust level indicating a degree of trust between a rater of the particular retrieved rating and the first user, the degree of trust for a particular trust level being inverse to a number of degrees the rater of the particular retrieved rating is from the first user, a category trust level based on a value assigned by the first user to the first group with respect to the category and values assigned by other members of the first group with respect to the category, and a quantity of ratings for data rated by the particular retrieved rating;
wherein the degree of trust is based on a radius of connection determined by a degree that the first user is connected to the rater of the particular retrieved rating, the first user defining a maximum degree of raters to be used in the particular retrieved rating.

2. The method of claim 1, wherein the category selected relates to a website and the particular retrieved rating includes a location of a website rated by the particular retrieved rating.

3. The method of claim 1, wherein the first rater is trusted by the first user.

4. An apparatus comprising:
a processor; and
a memory to store computer program instructions, the computer program instructions when executed on the processor cause the processor to perform operations comprising:
receiving a selection of a category from a first user;
retrieving ratings associated with the category received from a first rater, wherein the ratings associated with the category retrieved correspond to a first group to which the first user and the first rater both belong but a second user does not belong, wherein retrieving ratings further comprises:
based on the first user and the first rater belonging to the first group, retrieving a second rating from the first rater that corresponds to a second group to which the first rater and the second user both belong but the first user does not belong; and
providing a particular retrieved rating to the first user, the particular retrieved rating based on: a weighting of the particular retrieved rating, a trust level indicating a degree of trust between a rater of the particular retrieved rating and the first user, the degree of trust for a particular trust level being inverse to a number of degrees the rater of the particular retrieved rating is from the first user, a category trust level based on a value assigned by the first user to the first group with respect to the category and values assigned by other members of the first group with respect to the category, and a quantity of ratings for data rated by the particular retrieved rating;
wherein the degree of trust is based on a radius of connection determined by a degree that the first user is connected to the rater of the particular retrieved rating, the first user defining a maximum degree of raters to be used in the particular retrieved rating.

5. The apparatus of claim 4, wherein the category selected relates to a website and the particular retrieved rating includes a location of a website rated by the particular retrieved rating.

6. A non-transitory computer-readable medium storing computer program instructions for providing ratings to a user, which, when executed on a processor, cause the processor to perform operations comprising:
receiving a selection of a category from a first user;
retrieving ratings associated with the category received from a first rater, wherein the ratings associated with the category retrieved correspond to a first group to which the first user and the first rater both belong but a second user does not belong, wherein retrieving ratings further comprises:
based on the first user and the first rater belonging to the first group, retrieving a second rating from the first rater that corresponds to a second group to which the first rater and the second user both belong but the first user does not belong; and
providing a particular retrieved rating to the first user, the particular retrieved rating based on: a weighting of the particular retrieved rating, a trust level indicating a degree of trust between a rater of the particular retrieved rating and the first user, the degree of trust for a particular trust level being inverse to a number of degrees the rater of the particular retrieved rating is from the first user, a category trust level based on a value assigned by the first user to the first group with respect to the category and values assigned by other members of the first group with respect to the category, and a quantity of ratings for data rated by the particular retrieved rating;
wherein the degree of trust is based on a radius of connection determined by a degree that the first user is connected to the rater of the particular retrieved rating, the first user defining a maximum degree of raters to be used in the particular retrieved rating.

7. The non-transitory computer-readable storage medium of claim 6, wherein the category selected relates to a website and the particular retrieved rating includes a location of a website rated by the particular retrieved rating.

8. The non-transitory computer-readable storage medium of claim 6, wherein the first rater is trusted by the first user.

9. The non-transitory computer-readable storage medium of claim 6, wherein a plurality of website locations is provided to the first user based on the trust level of the rater.

* * * * *